(12) United States Patent
Dahlen et al.

(10) Patent No.: US 10,338,307 B2
(45) Date of Patent: Jul. 2, 2019

(54) LUMINAIRE HAVING LIGHT PIPE ASSEMBLY AND METHOD OF ASSEMBLY

(71) Applicant: KENALL MANUFACTURING COMPANY, Kenosha, WI (US)

(72) Inventors: Kevin Dahlen, Lindenhurst, IL (US); Brandon Stolte, Lindenhurst, IL (US)

(73) Assignee: KENALL MANUFACTURING COMPANY, Kenosha, WI (US)

( * ) Notice: Subject to any disclaimer, the term of this patent is extended or adjusted under 35 U.S.C. 154(b) by 0 days.

(21) Appl. No.: 15/666,262

(22) Filed: Aug. 1, 2017

(65) Prior Publication Data

US 2019/0041572 A1 Feb. 7, 2019

(51) Int. Cl.
| | | |
|---|---|---|
| *F21V 7/04* | (2006.01) | |
| *F21V 8/00* | (2006.01) | |
| *F21V 3/02* | (2006.01) | |
| *F21V 19/00* | (2006.01) | |
| *F21V 29/74* | (2015.01) | |
| *F21Y 115/10* | (2016.01) | |

(52) U.S. Cl.
CPC .............. *G02B 6/0096* (2013.01); *F21V 3/02* (2013.01); *F21V 19/0015* (2013.01); *F21V 29/74* (2015.01); *F21Y 2115/10* (2016.08)

(58) Field of Classification Search
CPC ......... G02B 6/0096; F21V 29/74; F21V 3/02; F21V 19/0015; F21Y 2115/10
See application file for complete search history.

(56) References Cited

U.S. PATENT DOCUMENTS

| | | | | |
|---|---|---|---|---|
| 4,551,654 A | * | 11/1985 | Barnum | H05B 37/0227 318/159 |
| 6,441,943 B1 | * | 8/2002 | Roberts | B60Q 1/2665 359/267 |
| 6,909,239 B2 | * | 6/2005 | Gauna | F21S 8/035 315/134 |
| 6,940,230 B2 | * | 9/2005 | Myron | H05B 37/0227 315/159 |
| 7,476,002 B2 | * | 1/2009 | Wolf | A01M 1/2083 362/231 |
| 7,521,872 B2 | * | 4/2009 | Bruning | H05B 33/0821 315/149 |
| 8,946,996 B2 | * | 2/2015 | Ivey | F21V 23/0464 315/130 |
| 9,681,520 B1 | * | 6/2017 | Berry | H05B 37/0218 |
| 9,704,364 B2 | * | 7/2017 | Savage, Jr. | G08B 5/38 |
| 2010/0294961 A1 | * | 11/2010 | Ashdown | G01J 1/04 250/552 |
| 2015/0091451 A1 | * | 4/2015 | Williams | H02J 9/065 315/160 |

(Continued)

*Primary Examiner* — Ali Alavi
(74) *Attorney, Agent, or Firm* — Marshall, Gerstein & Borun LLP; Randall G. Rueth

(57) ABSTRACT

A luminaire with a light pipe assembly and related methods of assembly are provided. According to one aspect, the luminaire may include a housing and lens covering an opening formed in the housing. A light source may be disposed in the housing and configured to emit artificial light in a forward direction toward the lens. The light pipe assembly may span at least a portion of a distance between the lens and the light source, and may be configured to transport ambient light rays present in an environment outside of the housing to a location within the housing isolated from the artificial light.

24 Claims, 4 Drawing Sheets

(56) References Cited

U.S. PATENT DOCUMENTS

2016/0123569 A1* 5/2016 Cummings ............. F21S 2/005
362/249.02
2016/0375162 A1* 12/2016 Marry ................ H05B 33/0854
422/22

* cited by examiner

LUMINAIRE HAVING LIGHT PIPE ASSEMBLY AND METHOD OF ASSEMBLY

FIELD OF DISCLOSURE

The present disclosure generally relates to luminaires and, more particularly, to luminaires having various sensing capabilities.

BACKGROUND

Many commercial buildings, parking structures, transportation areas or structures (e.g., tunnels), and the like are equipped with lighting systems that include one or more luminaires or light fixtures for illuminating certain areas. Some luminaires are equipped with one or more sensors for detecting changes in the surrounding environment. Typically such sensors are mounted on the exterior of the luminaire in order to maximize their field of view or optimize other detection capabilities.

However, several challenges result from mounting a sensor on the exterior of a luminaire. In the case of an outdoor luminaire, the sensor may be exposed to rain, pollutants, and other elements that can damage or degrade sensitive components incorporated into the sensor. Furthermore, an exposed sensor may heighten the risk of theft. Additionally, if the sensor is positioned below or in front of the light source, the sensor may cast undesirable shadows or adversely affect the light output.

The present disclosure sets forth luminaires embodying advantageous alternatives to existing luminaires, and that may address one or more of the challenges or needs mentioned herein, as well as provide other benefits and advantages.

SUMMARY

One aspect of the present disclosure provides a luminaire including a housing, a lens, a light source disposed in the housing, and a light pipe assembly. The lens may cover an opening formed in the housing, and the light source may be configured to emit artificial light in a forward direction toward the lens. The light pipe assembly may span at least a portion of a distance between the lens and the light source. Furthermore, the light pipe assembly may be configured to transport ambient light rays present in an environment outside of the housing to a location within the housing isolated from the artificial light from the light source.

Another aspect of the present disclosure provides a light pipe assembly for a luminaire. The light pipe assembly may include an elongated light pipe member having a light entry end and a second end. Additionally, the light pipe assembly may include a collar member arranged around the light entry end of the elongated light pipe member. The collar member may have an interior surface configured to sealingly engage an exterior surface of the light entry end of the elongated light pipe member.

An additional aspect of the present disclosure provides a method of assembling a luminaire. The method may include: (a) providing a housing including an opening, a light source connected within the housing and configured to emit artificial light toward the opening, and an elongated light pipe member connected within the housing, the elongated light pipe member having a light entry end positioned adjacent to the opening and a second end positioned adjacent to the light source; (b) inserting a collar member into an opening formed in a first lens; (c) aligning an opening formed in the collar member with the light entry end of the elongated light pipe member; and (d) covering the opening formed in the housing with the first lens such that the light entry end of the elongated light pipe member is received within the opening formed in the collar member.

BRIEF DESCRIPTION OF THE DRAWINGS

It is believed that the disclosure will be more fully understood from the following description taken in conjunction with the accompanying drawings. Some of the drawings may have been simplified by the omission of selected elements for the purpose of more clearly showing other elements. Such omissions of elements in some drawings are not necessarily indicative of the presence or absence of particular elements in any of the exemplary embodiments, except as may be explicitly delineated in the corresponding written description. Also, none of the drawings is necessarily to scale.

DETAILED DESCRIPTION

Figure 1:
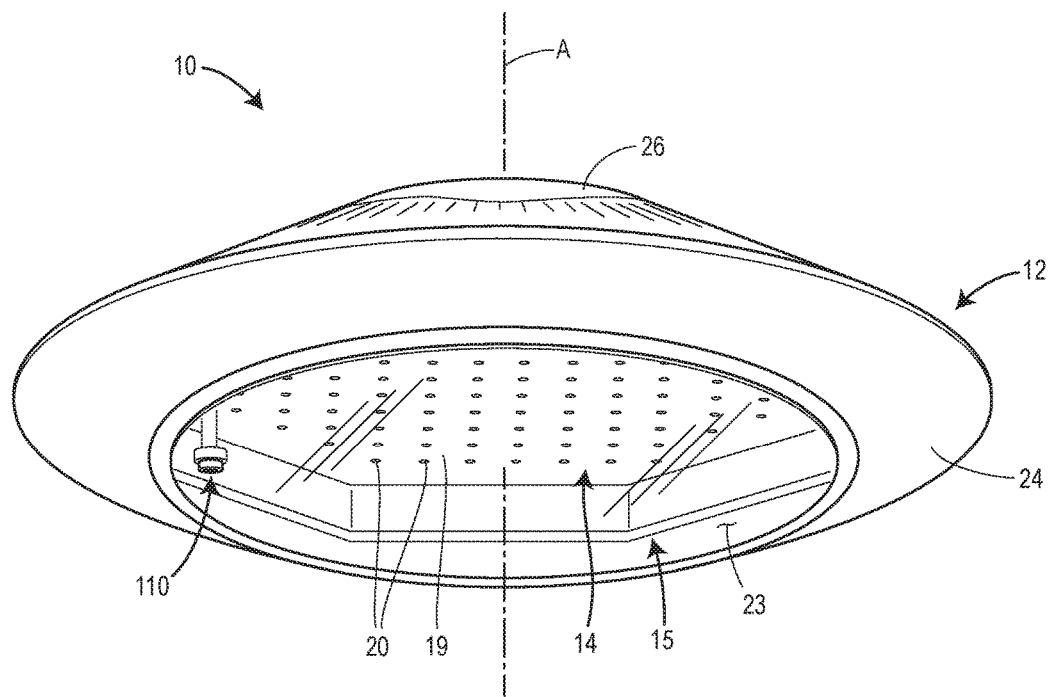
FIG. 1 is a perspective bottom view of an embodiment of a luminaire in accordance with principles of the present disclosure.
Figure 2:
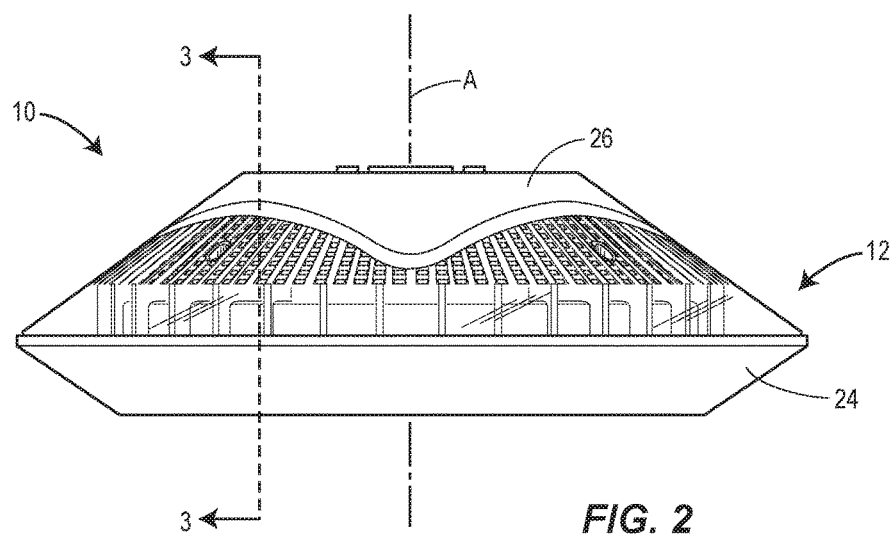
FIG. 2 is a side view of the embodiment of the luminaire illustrated in FIG. 1.

In general, the present disclosure relates to configuring a luminaire with sensing capabilities without compromising the performance or integrity of the luminaire. The presently disclosed luminaires may include a sensing assembly which is protected within the luminaire yet capable of detecting changes in the environment outside of the luminaire. In order to reduce the possibility of artificial light emitted by the luminaire from interfering with measurements taken by the sensing assembly, the sensing assembly, or at least a portion thereof, may be positioned at a location within the luminaire where it is isolated or shielded from the artificial light. Furthermore, a light pipe assembly may be included for channeling or otherwise transporting ambient light rays present in the outside environment to the interior location where the sensing assembly is disposed. So configured, the light pipe assembly may advantageously allow the sensing assembly to be hidden from view inside the luminaire while facilitating accurate measurements of ambient lighting conditions by the sensing assembly. Moreover, the light pipe assembly according to the present disclosure may include various features for inhibiting or preventing artificial light from leaking into a light entry end of the light pipe assembly.

Each of the foregoing components, and other components, of the luminaire will now be described in more detail.

FIGS. 1-5 depict one embodiment of a lighting fixture or luminaire 10 constructed in accordance with principles of the present disclosure. The luminaire 10 is generally suitable for either outdoor use or indoor use. The luminaire 10 may, for example, be used in a parking garage, commercial building, roadway, tunnel, residential home or building, or other structure or environment. In some embodiments, the luminaire 10 may be associated with a lighting system or a portion thereof, such as, for example, a lighting system included or employed in a parking garage (or a floor or section of the parking garage), a commercial building (or a portion thereof), a roadway, tunnel, or other structure (or a portion thereof), a residential home or building, or other indoor or outdoor space or environment. In some embodiments, such a lighting system may include a plurality of luminaires 10. In one version, the lighting system may include a plurality of uniformly constructed luminaires 10. In another version, the lighting system may include a plurality of luminaires 10 of different types, sizes, and/or shapes. Furthermore, the plurality of luminaires 10 may be connected to one another via a wired or wireless connection (e.g., such as to form a mesh network). Still further, such a lighting system may be interfaced with a control system configured to intelligently control the components of the lighting system. In such an embodiment, the luminaires 10 of the lighting system may be communicatively connected to and, once commissioned, controlled remotely by a central controller or similar device or component of the control system. As such, the luminaires 10 may transmit data, such as operating status, driver status, hardware information, occupancy data, daylight levels, temperature, power consumption, to the central controller (or similar device) and may receive, from the central controller (or similar device), operational instructions (e.g., turn on, turn off, dim, etc.) and/or other data (e.g., operational data from other luminaires 10).

In general, the luminaire 10 may include a housing 12, a light source 14 mounted within the housing 12, a lens 15 (e.g., a diffuser) connected to the housing 12 and covering the light source 14, and an electronics control assembly 16 and a sensing assembly 18 each being mounted within the housing 12. In the depicted version, the light source 14 includes a generally circular circuit board 19 with multiple light emitting diodes (LEDs) 20 each being configured to emit artificial light generally in a forward direction, or a downward direction depending on the orientation of the luminaire 10 relative to the ground, toward a rearwardly or upwardly facing portion of the interior surface 22 of the lens 15. The housing 12 may include a bottom part 24 and a top part 26, with the bottom part 24 being configured to face toward the ground or otherwise in a downward or forward direction when the luminaire 10 is installed. An opening 17 may be formed in the bottom part 24 of the housing 12 and may be centrally aligned with a longitudinal axis A of the luminaire 10. The lens 15 may extend partially or entirely across the opening 17 when attached to the bottom part 24 of the housing 12. In some embodiments, the bottom part 24 of the housing 12 and the top part 26 of the housing 12 may be separate components which are fastened or otherwise secured together to define an interior space 32 enclosed by the housing 12. In other embodiments, the bottom part 24 and the top part 26 may be integrally formed as a single, unitary structure.

Figure 3A:
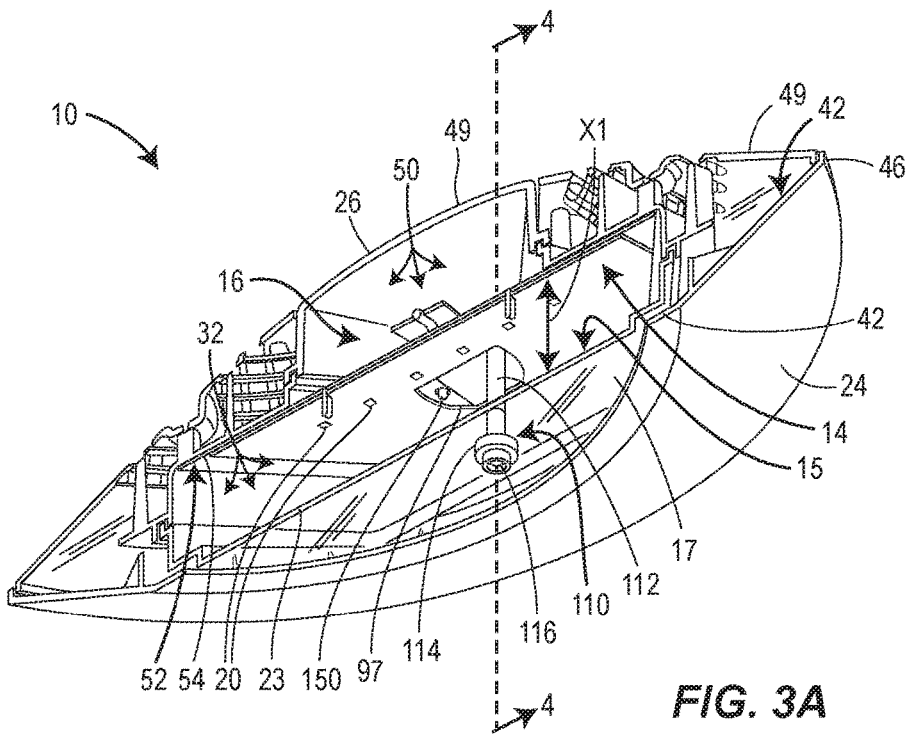
FIGS. 3A and 3B are cross-sectional perspective views of the luminaire illustrated in FIG. 2, taken along imaginary line 3-3 of FIG. 2.
Figure 3B:
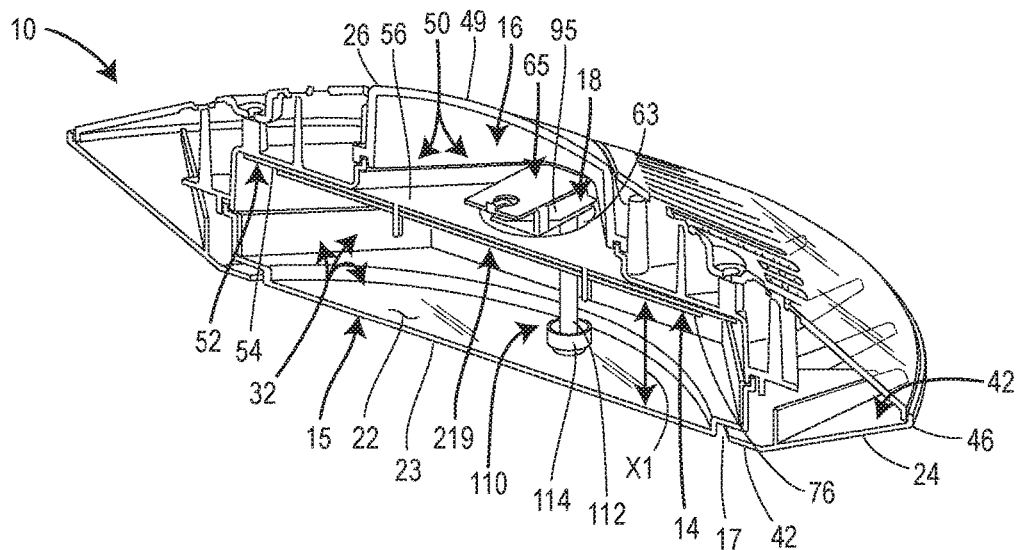

As shown in FIGS. 3A and 3B, the interior space 32 may contain the light source 14, the electronics control assembly 16, the sensing assembly 18, one or more mounting structures, and other internal components not explicitly illustrated such as, for example, electrical wiring, one or more communication modules (e.g., one or more antennae, receivers, and/or transmitters), one or more transformers, and/or other electrical components. Also, while not explicitly depicted, the electronics control assembly 16 may include one or more boards (e.g., one or more printed circuit boards and/or one or more user interface boards), one or more controllers (e.g., one or more microprocessors), and/or a one or more computer data storage units or memories. The electronics control assembly 16 and the sensing assembly 18 may be communicatively coupled by wiring or other means such that electrical signals can be sent and received therebetween. Furthermore, in some embodiments, the electronics control assembly 16 and the sensing assembly 18 may form a single unit and may, in some configurations, share a single circuit board.

With continued reference to FIGS. 3A and 3B, the housing 12 may generally have a saucer shape and may be manufactured from any suitably rigid and/or durable material including, but not limited to, metal (e.g., die cast aluminum and/or stainless steel) and/or certain types of plastic. The bottom part 24 of the housing 12 may be generally cylindrical and possess annular or circumferential wall 42 that extends around the longitudinal axis A. A bottom end 44 of the annular wall 42 may define a perimeter of the opening 17; and a top end 46 of the annular wall 42 may be connected directly to the top part 26 of the housing 12. The top part 26 of the housing 12 may include a top wall 49 defining a closed end of the housing 12. In some embodiments, the top wall 49 may include a mounting structure (e.g., a bracket, mounting plate, flexible cord, etc.) suitable for mounting or securing the housing 12, and thus the luminaire 10, to a wall, ceiling, or other surface.

Still referring to FIGS. 3A and 3B, a mounting assembly 50 may be disposed in the housing 12 and may be configured to connect and/or support various components of the luminaire 10. The mounting assembly 50 may include at least one support plate or bracket 52 and one or more fasteners or other connector members for rigidly connecting various components to the support plate 52. In the illustrated embodiment, the support plate 52 is integrally formed as a single, unitary structure. In alternative embodiments, the support plate 52 may be formed by multiple distinct structures which are rigidly connected to each other. In the present embodiment, the support plate 52 is mounted on the bottom part 24 of the housing 12 and the top part 26 of the housing 12; however, in other embodiments, the support plate 52 may be suspended from the top part 26 of the housing 12.

The support plate 52 may include a forwardly or downwardly facing surface 54 and a rearwardly or upwardly facing surface 56. The downwardly facing surface 54 of the support plate 52 may be positioned rearward of, or above depending on the orientation of the luminaire 10 relative to the ground, the opening 17 formed in the bottom part 24 of the housing 12 such that the downwardly facing surface 54 is spaced apart from the opening 17 by a vertical distance. Furthermore, as shown in FIGS. 3A and 3B, the light source 14 may be mounted on a central portion of the downwardly facing surface 54 of the support plate 52. Fastening members, such as screws, bolts, or other connector members, may be disposed through overlapping openings formed in the support plate 52 and the light source 14 in order to secure the support plate 52 to the light source 14. Separate and offset from the openings for receiving the fastening members, an opening may be formed in the support plate 52 directly below and thus overlapping or aligned with a portion of the sensing assembly 18.

In some embodiments, a plurality of fins may protrude from the support plate 52 or another portion of the mounting assembly 50 to help dissipate heat generated by the light source 14 and/or the electronics control assembly 16. In this way, the mounting assembly 50 may also serve as a heat sink.

With continued reference to FIGS. 3A and 3B, the sensing assembly 18 may be mounted rearward or above the upwardly facing surface 56 of the support plate 52. In the present embodiment, this is achieved by way of a bracket 65 which is fastened to the upwardly facing surface 56 of the support plate 52 and may be configured to cantilever a sensor 88, or multiple sensors, over (e.g., directly above or directly rearward) the opening 63 formed in the support plate 52. In other embodiments, the sensing assembly 18 may include a bracket or other connector member for suspending the sensor 88 from the top part 26 of the housing 12 such that the sensor 88 is positioned directly above or directly rearward of the opening 63.

Figure 4:
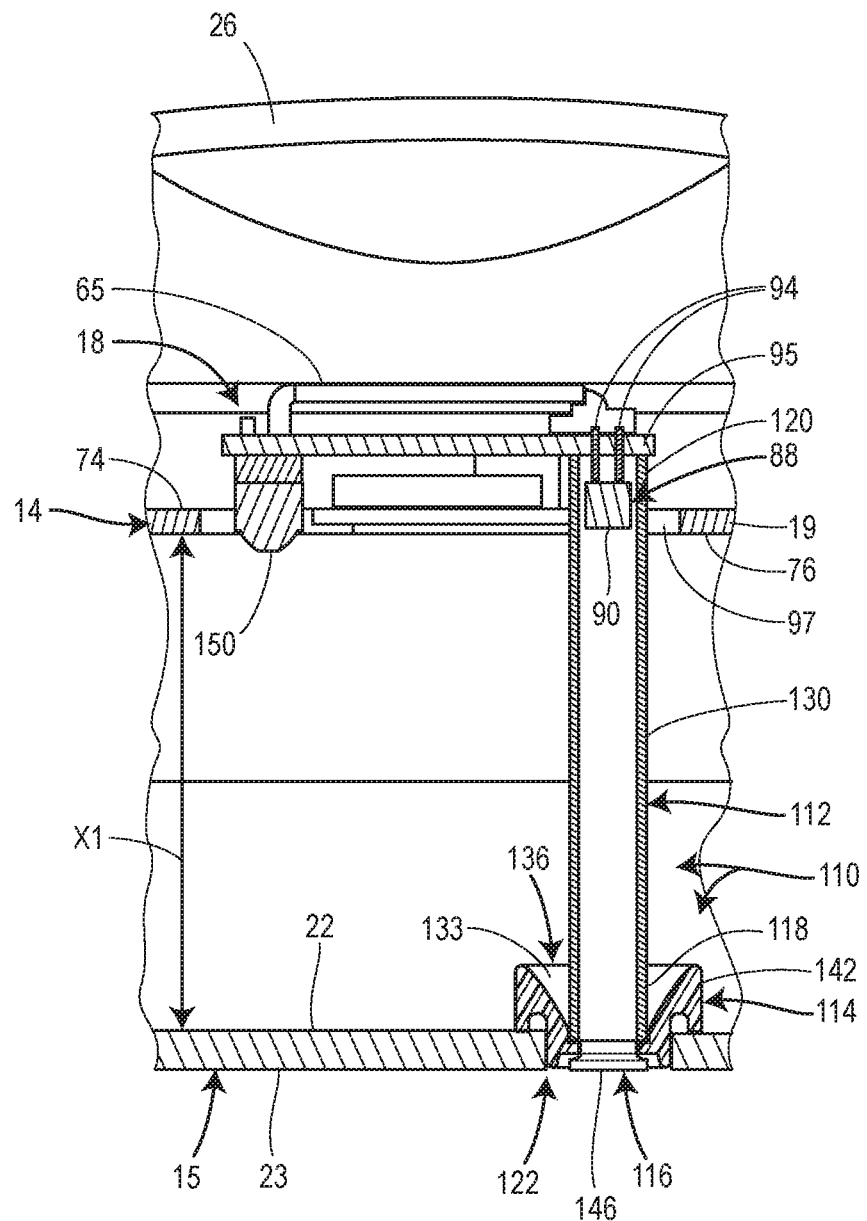
FIG. 4 is a cross-sectional side view of the light pipe assembly illustrated in FIG. 3A, taken along imaginary line 4-4.

In general, the sensor 88 may be configured to detect changes in the environment outside of the luminaire 10. In some embodiments, the sensor 88 may be configured to detect an intensity (e.g., brightness) of ambient light rays in a visible spectrum. As shown in FIGS. 3A, 3B, and 4, the sensor 88 may include a body portion 90, and a plurality of prongs 94 that extend upwardly or rearwardly from the body portion 90 and are in electrical contact with a circuit board 95 (e.g., a printed circuit board) in order facilitate electronic communication between the body portion 90 and, for example, the electronics control assembly 16. While the sensor 88 of the present embodiment takes the form of a light intensity sensor, in alternative embodiments the sensor 88 may take the form of a motion sensor configured to detect motion within a pre-determined range or distance from the luminaire 10 by measuring or detecting infrared light or other energy radiating from objects in the pre-determined range of the luminaire 10. Such a motion sensor may be configured as a passive infrared motion sensor, a microwave motion sensor, an ultrasonic motion sensor, a tomographic motion sensor, or any other suitable type of motion sensor. In further alternative embodiments, the sensor 88 may be configured as a temperature sensor. Furthermore, the sensor 88 is not limited to the structural configuration shown in FIGS. 3A and 3B; other versions of the sensor 88 may vary in shape, size, location, and/or construction. Moreover, fewer, or different, components for the sensor 88 are envisioned. For example, in some embodiments, a lens portion (e.g., a Fresnel lens) may be connected to and cover a bottom end of the body portion 90.

Still referring to FIGS. 1-3B, the lens 15 may have a generally planar shape with at least a portion of the interior surface 22 being flat or substantially flat and at least a portion of the exterior surface 23 being flat or substantially flat. In other embodiments, the lens 15 may generally have the shape of an inverted dome or bowl with a curved forwardly or downwardly facing exterior surface 23. The lens 15 may be generally translucent and configured to diffusely transmit and/or diffusely reflect light emitted from the light source 14. In some embodiments, the lens 15 may diffusively transmit approximately (e.g., ±10%) 80% of the artificial light emitted by the light source 14, and diffusively reflect the remaining approximately (e.g., ±10%) 20% of the artificial light emitted by the light source 14. By diffusively transmitting light emitted from the LEDs 20, the lens 15 may provide a scattering effect that substantially reduces glare and/or creates the effect of a uniformly luminous surface, which is generally considered more aesthetically pleasing than the distinct points of light that may be created by the LEDs 20. The lens 15 may be constructed of any suitable material including, but not limited to, plastic (e.g., acrylic or polycarbonate) and/or glass, and this material may be chosen depending on the desired amount of light scattering.

In some embodiments, an interior surface 22 of the lens 15 and/or the exterior surface 23 of the lens 15 may be textured in order to diffusively transmit and/or diffusively reflect the light emitted from the light source 14. Additionally, in some embodiments, the lens 15 may be constructed of a material which does not polarize the light emitted from the light source 14.

As shown in FIGS. 3A and 3B, the interior surface 22 of the lens 15 may be spaced apart from a downwardly facing surface 76 of the circuit board 19 of the light source 14 by a vertical distance X1. The vertical distance X1 may be within a range between approximately (e.g., ±10%) 0.5-6 inches, or within a range between approximately (e.g., ±10%) 0.5-3 inches, or within a range between approximately (e.g., ±10%) 0.5-1 inches, or equal to or less than approximately (e.g., ±10%) 6 inches, or equal to or less than approximately (e.g., ±10%) 3 inches, or equal to or less than approximately (e.g., ±10%) 1.5 inches, or equal to or less than approximately (e.g., ±10%) 1 inch.

The LEDs 20 may be mounted in a pattern on a forwardly or downwardly facing surface of the circuit board 19. In addition to, or as an alternative to, the LEDs 20, the light source 14 may include other light emitting elements such as, for example, one or more incandescent bulbs, one or more fluorescent bulbs, one or more high-intensity discharge bulbs, and/or one or more plasma bulbs. The LEDs 20 may receive power from an external source of electricity (not illustrated). In general, the electronics control assembly 16 and/or the circuit board 19 may be configured to control the manner or rate with which power is supplied to the LEDs 20 from the external source of electricity. In some embodiments, the electronics control assembly 16 and/or the circuit board 19 may be responsible for automatically dimming or turning ON/OFF various LEDs 20 in response to signals received from the sensing assembly 18 and/or programmable instructions stored in a computer memory device onboard the luminaire 10 or received wirelessly, or through a wired connection, by the luminaire 10.

In some embodiments, each of the LEDs 20 may be integrally formed with a primary optic or lens that provides, for example, a lambertian light distribution. Additionally, in some embodiments, each of the primary optics or lenses may be covered by a secondary optic or lens. In such embodiments, the lens 15 may be referred to as a tertiary optic or lens.

The circuit board 19 may possess a generally planar or flat construction with a circular outer perimeter. In some embodiments, the circuit board 19 may have an outer diameter, or other outer dimension, within a range between approximately (e.g., ±10%) 6-36 inches, or in range between approximately (e.g., ±10%) 6-30 inches, or in range between approximately (e.g., ±10%) 6-24 inches, or in range between approximately (e.g., ±10%) 6-18 inches, or in range between approximately (e.g., ±10%) 10-18 inches, or equal to or greater than approximately (e.g., ±10%) 6 inches, or equal to or greater than approximately (e.g., ±10%) 8 inches, or equal to or greater than approximately (e.g., ±10%) 10 inches, or equal to or greater than approximately (e.g., ±10%) 12 inches. The circuit board 19, however, is not limited to having a circular shape and may, in alternative embodiments, have a rectangular, square, triangular, irregular, or other suitable shape.

In general, the circuit board 19 may be configured to mechanically support and electrically connect various electronic components, including the LEDs 20. In some embodiments, the circuit board 19 may be a printed circuit board, such as, for example, a single-side, double-sided, or multilayer printed circuit board. The circuit board 19 may include an electrically non-conductive substrate member and a plurality of electrically conductive elements mounted on and/or embedded within the electrically non-conductive substrate member. The electrically conductive elements may be electrically coupled to the LEDs 20 and supply the LEDs 20 with electricity from the external source. In some embodiments, the electrically conductive elements may be electrically conductive tracks, pads, or other features which are etched from a copper or other metal sheet that is laminated onto the non-conductive substrate member. In other embodiments, the electrically conductive elements may be wires made of copper or another metal material. The electrically non-conductive substrate member may be a composite material including a matrix material (e.g., an epoxy resin), a reinforcement material (e.g., woven or non-woven glass fibers), and/or a filler (e.g., a ceramic). Furthermore, while the electrically non-conductive substrate member of the present embodiment is single, unitary structure, in other embodiments the electrically non-conductive substrate member may be formed by multiple, distinct structures which are fastened, adhered, or otherwise connected to each other.

Referring to FIGS. 3A, 3B, and 4, the circuit board 19 may include a rearwardly or upwardly facing surface 74 and a forwardly or downwardly facing surface 76. The LEDs 20 may be mounted on (e.g., fastened to, adhered to, or soldered to) the downwardly facing surface 76 of the circuit board 19. Furthermore, an opening 97 may be formed in the circuit board 19 and may extend between the downwardly facing surface 76 and the upwardly facing surface 74 of the circuit board 19. In some embodiments, the opening 97 may interrupt the pattern of LEDs 20; whereas, in other embodiments the opening 97 may be formed on a lateral side of (e.g., radially outwardly of) the LEDs 20 so as to not interrupt their pattern.

At least a portion of, or the entirety of, the sensing assembly 18 may be positioned directly rearward of, or directly above depending on the orientation of the luminaire 10 relative to the ground, the opening 97 formed in the circuit board 19. In some embodiments, an imaginary linear axis that is parallel to the longitudinal axis A of the luminaire 10, or the longitudinal axis A itself, may pass through both the sensing assembly 18 and the opening 97, and the lens 15 too. Furthermore, in some embodiments, the sensor 88 may be positioned directly rearward of or above and/or aligned or overlapping with the opening 97. In such embodiments, an imaginary linear axis that is parallel to the longitudinal axis A of the luminaire 10, or the longitudinal axis A itself, may pass through both the sensor 88 and the opening 97, as well as the lens 15. However, in alternative embodiments, the portion of the sensing assembly 18 which is aligned or overlapping with the opening 97 may not include the sensor 88.

With continued reference to FIGS. 3A, 3B, and 4, at least a portion of the sensing assembly 18 may be spaced apart from the opening 97 by a vertical distance with empty space existing between the sensing assembly 18 and the opening 97. Though most of the sensing assembly 18 may be positioned above the opening 97 formed in the circuit board 19, the body portion 90 of the sensor 88 may be positioned within the opening 97 formed in the circuit board 19, as shown in FIG. 4. Furthermore, in some embodiments, the body portion 90 of the sensor 88 may be positioned forward of or below the circuit board 19.

A consequence of positioning the sensor 88 within the housing 12 and above or rearward of the lens 15 is that the sensor 88 may be exposed to artificial light reflected by the interior surface 22 of the lens 15. In certain situations, such as when the sensor 88 is intended to detect the intensity (e.g., brightness) of ambient light present in the outside environment, allowing artificial light from the light source to strike the sensor 88 may result in inaccurate measurements of the ambient lighting levels by the sensor 88. The luminaire 10 addresses this issue by including a light pipe assembly 110 configured to transport or channel ambient light rays from the outside environment directly to the sensor 88, while simultaneously shielding or isolating the sensor 88 from artificial light that is internally reflected, or otherwise present, within the luminaire 10. So configured, the light pipe assembly 110 advantageously allows the sensor 88 to be positioned at a location within the housing 12 that is free of, or substantially free of, artificial light emitted by the light source 10. In some embodiments, this location may be disposed within the light pipe assembly 110 itself; whereas in other embodiments this location may be immediately adjacent to a terminal end the light pipe assembly 110.

Figure 5:
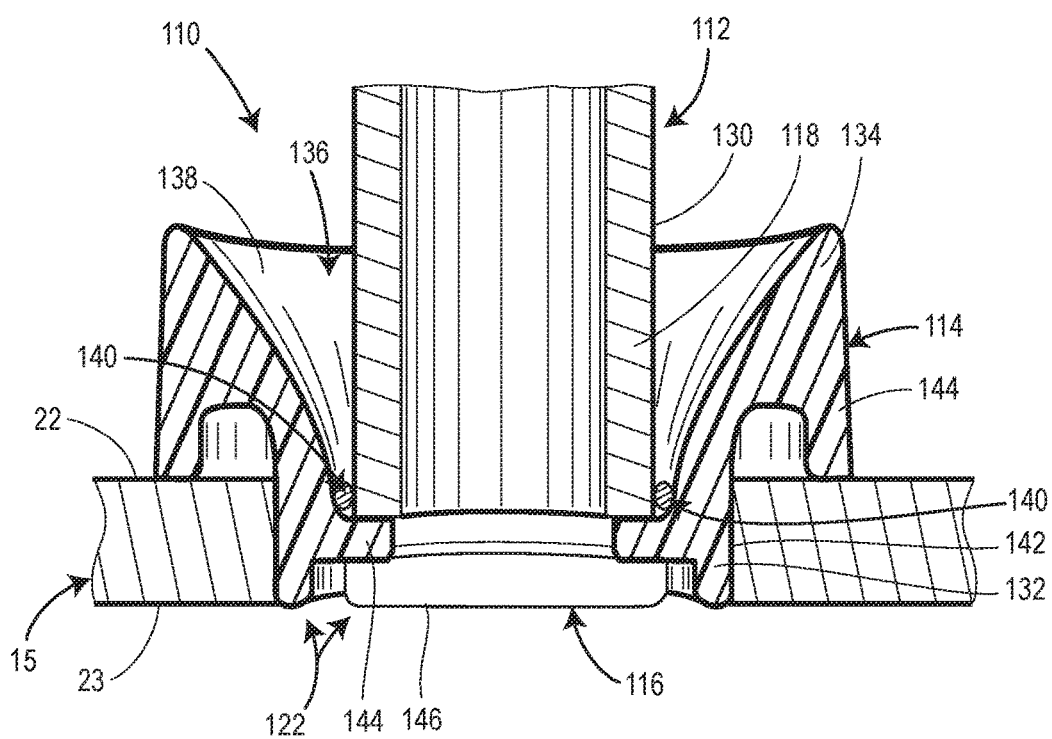
FIG. 5 is an enlarged view of the collar member illustrated in FIG. 4.

Referring to FIGS. 4 and 5, the light pipe assembly 110 may generally include an elongated light pipe member 112, a collar member 114 disposed around an exterior of the elongated light pipe member 112, and a lens 116. In some embodiments, the elongated light pipe member 112 may be a hollow cylinder extending along a linear axis. In other embodiments, the elongated light pipe member 112 may be a hollow elongated member such as a tube that extends along a curved or otherwise non-linear axis. In still further alternative embodiments, the elongated light pipe member 112 may be a solid (i.e., non-hollow) member and may have an interior that is made of a light transmissive material, such as plastic or glass, for example. As used herein, the term "elongated" should not be understood to mean or imply that the structure which is "elongated" has been stretched.

The elongated light pipe member 112 may include a first or light entry end 118 and a second end 120. The elongated light pipe member 112 may extend through the opening 97 formed in the circuit board 19 of the light source 14 such that the light entry end 118 is disposed below or forward of the light source 14 and the second end 120 is disposed above or rearward of the light source 14, as shown in FIG. 4. In alternative embodiments, both the light entry end 118 and the second end 120 of the elongated light pipe member 112 may be positioned forward of or below the light source 14. In such alternative embodiments, as well as in the illustrated embodiment, the elongated light pipe member 112 may span at least a portion of the distance X1 between the light source 14 and the lens 15. In the illustrated embodiment, the length of the elongated light pipe member 112 is greater than the distance X1 between the light source 14 and the lens 15; whereas, in alternative embodiments, the length of the elongated light pipe member 112 may be equal to or less than the distance X1 between the light source 14 and the lens 15. The length of the elongated light pipe member 112 may be within a range between approximately (e.g., ±10%) 0.5-6 inches, or within a range between approximately (e.g., ±10%) 0.5-3 inches, or within a range between approximately (e.g., ±10%) 0.5-1 inches, or equal to or less than approximately (e.g., ±10%) 6 inches, or equal to or less than approximately (e.g., ±10%) 3 inches, or equal to or less than approximately (e.g., ±10%) 1.5 inches, or equal to or less than approximately (e.g., ±10%) 2 inches or equal to or less than approximately (e.g., ±10%) 1 inch.

As shown in FIGS. 4 and 5, the light entry end 118 may be axially aligned with an opening 122 formed in the lens 15 such that ambient light rays can pass through the lens 15 and into the light entry end 118 of the elongated light pipe member 112. In the illustrated embodiment, the light entry end 118 of the elongated light pipe member 112 extends partially into the opening 122 formed in the lens 15. In alternative embodiments, the light entry end 118 of the elongated light pipe member 112 may extend entirely through the opening 122. In still further alternative embodiments, the light entry end 118 of the elongated light pipe member 112 may be positioned directly above or rearward of the opening 122.

In some embodiments, the opening 122 in the lens 15 may be circular and have a diameter equal to approximately (e.g., ±10%) 0.4375 inches, or equal to or less than approximately (e.g., ±10%) 0.5 inches, or equal to or less than approximately (e.g., ±10%) 1 inch.

In the illustrated embodiment, the light entry end 118 of the elongated light pipe member 112 has an opening and the second end 120 of the elongated light pipe member 112 includes another opening. As shown in FIG. 4, the body portion 90 of the sensor 88 may be disposed in the second end 120 of the elongated light pipe member 112, and the prongs 94 of the sensor 88 may extend outwardly through the opening formed in the second end 120. In alternative embodiments, the body portion 90 of the sensor 88 may be positioned outside of the elongated light pipe member 112 directly above or rearward of the opening in the second end 320 of the elongated light pipe member 112, such that the ambient light rays transmitted through the elongated light pipe member 112 are emitted from the second end 120 and onto the body portion 90 of the sensor 88. In still further alternative embodiments, only the light entry end 118 may have an opening and the second end 120 may be closed off by a wall. In such alternative embodiments, at least the body portion 90 of the sensor 88 may be positioned within the second end 120 of the elongated light pipe member 112.

The elongated light pipe member 112 may possess an exterior surface 130 that is opaque so as to prevent or inhibit artificial light from the light source 14 from being transmitted through the wall of the elongated light pipe member 112 and striking the sensor 88. The opaque exterior surface 130 may be achieved by constructing the elongated light pipe member 112 of an opaque material and/or coating the elongated light pipe member 112 with an opaque paint or film. Accordingly, only light rays, such as ambient light rays, that enter the elongated light pipe member 112 via the light entry end 118 may be able to strike the sensor 88. Furthermore, in some embodiments, the second end 120 of the elongated light pipe member 112 may abut flushly against an interior structure of the luminaire 10, such as the circuit board 95 shown in FIG. 4, so that artificial light is prevent or inhibited from seeping into the opening formed in the second end 120 of the elongated light pipe member 112.

With reference to FIG. 5, the collar member 114 may generally take the form of an annular wall that is arranged around the light entry end 118 of the elongated light pipe member 112, and furthermore may be used to connect the light entry end 118 of the elongated light pipe member 112 to the lens 15. The collar member 114 may include a first or bottom end 132 inserted into the opening 122 formed in the lens 15, and a second or top end 134 positioned above or rearward of the lens 15. In some embodiments, the first end 132 of the collar member 114 may sealingly engage a surface of the lens 15 defining the opening 122 so as to prevent or inhibit the ingress water and other environmental elements through the opening 122. A central opening or through hole 136 may extend through the first and second ends 132 and 134 of the collar member 114. The opening 136 may be surrounded and defined by an interior surface 138 of the collar member 114. As shown in FIG. 5, at least a portion of the interior surface 138 of the collar member 114 may be funnel-shaped such that a cross-sectional area of the opening 136 gradually decreases or tapers when moving from the second end 134 of the collar member 114 toward the first end 132 of the collar member 114. As described below in more detail, this funnel shape may assist with guiding the light entry end 118 of the elongated light pipe member 112 into the collar member 114 during assembly or installation of the luminaire 10.

The interior surface 138 of the collar member 114 may sealingly or otherwise snugly engage the exterior surface 130 of the elongated light pipe member 112, for example, with no gaps therebetween, thereby inhibiting or preventing artificial light from the light source 14 from leaking into the opening formed in the light entry end 118 of the elongated light pipe member 112. In some embodiments, such as the one illustrated in FIG. 5, an O-ring 140 may be fitted around the light entry end 118 of the elongated light pipe member 112 to ensure a tight fit between the exterior surface 130 of the light entry end 118 of the elongated light pipe member 112 and the interior surface 138 of the collar member 114. In such embodiments, the interior surface 138 of the collar member 114 may sealingly engage the exterior surface 130 of the elongated light pipe member 112 by way of the O-ring 140.

In addition to assisting with alignment of the light entry end 118 of the elongated light pipe member 112 relative to the opening 122 formed in the lens 15, the collar member 114, by virtue of being positioned in the opening 122 formed in the lens 15, may function as a light barrier that inhibits or prevents artificial light internally reflected or trapped within the lens 15 from entering the light entry end 118 of the elongated light pipe member 112. Pursuant to this function, the collar member 114 may be constructed of an opaque material and/or coated with an opaque paint or film, such that an exterior surface 142 of the collar member 118 does not transmit the artificial light internally reflected or trapped within the lens 15.

Referring to FIG. 5, the second end 134 of the collar member 114 may include a flange 144 which is disposed radially outwardly of the first end 132 of the collar member 114. Furthermore, the flange 114 may be configured to engage the interior surface 22 of the lens 15 when the first end 132 of the collar member 114 is inserted into the opening 122 formed in the lens 15. In this way, the flange 144 may act as a stopping member that prevents the collar member 114 from falling, or being pushed or pulled, through the opening 122.

With continued reference to FIG. 5, the lens 116 may be connected to the second end 134 of the collar member 114 in a manner covering the light entry end 118 of the elongated light pipe member 112. In the illustrated embodiment, the lens 116 is partially inserted into and gripped by an annular ridge 144 protruding inwardly from the interior surface 138 of the collar member 114. On a side of the annular ridge 144 opposite to the lens 116, the light entry end 118 of the elongated light pipe member 112 may abut against an upwardly or rearwardly facing surface of the annular ridge 144. This configuration may require all light the enters the light entry end 118 of the elongated light pipe member 112 to initially pass through the lens 116. In some embodiments, the lens 116 may be configured to direct the ambient light rays toward, or focus the ambient light rays on, the sensor 88. The lens 116 may be configured as a Fresnel lens in some embodiments to have this focusing effect. In alternative embodiments, instead of being gripped by the collar member 114, the lens 116 may be mounted directly on the elongated light pipe member 112 in a manner covering the light entry end 118 of the elongated light pipe member 112.

An exterior surface 146 of the lens 116 may be level or substantially level with the exterior surface 146 of the lens 116 so that the exterior surface 23 of the lens has the appearance of generally smooth surface despite the presence of the opening 122. Also, pursuant to these ends, in some embodiments the first end 132 of the collar member 114 may terminate at position that is level or substantially level with the exterior surface 23 of the lens 15. In alternative embodiments, the lens 116 may be omitted.

In operation, the sensor 88 is, by virtue of being disposed within or immediately above the second end 120 of the elongated light pipe member 112, positioned to accurately measure ambient lighting conditions outside of the luminaire 10 without being influenced by, or not being substantially influenced by, artificial light emitted light source 14. In some embodiments, the sensor 88 may be configured to detect an intensity (e.g., brightness) of the ambient light rays in a visible spectrum. When the sensor 88 detects an intensity of ambient light rays within a pre-determined range of intensities, this information may be communicated as an electric signal to the components of the electronics control assembly 16 within the housing 12. The electronics control assembly 16 may, responsive to this information, subsequently cause the light source 14 to emit light, not emit light, emit more light, and/or emit less light. Alternatively or additionally, the components of the electronics control assembly 16 (e.g., via wireless antennae) may transmit this information to the central controller and/or other luminaires 10. Based on this information, other luminaires 110, particularly adjacent luminaires 10, may be controlled accordingly (e.g., turned on, turned off, dimmed, or brightened).

Referring back to FIG. 4, in addition to the sensor 88, the sensing assembly 18 may include a motion sensor 150. The motion sensor 150 may be positioned above or rearward of and/or aligned or overlapping with the opening 97 in the circuit board 19. The motion sensor 150 may configured to detect motion within a pre-determined range or distance from the luminaire 10 by measuring or detecting infrared light or other energy radiating from objects in a pre-determined range of the luminaire 10. Pursuant to these ends, the motion sensor 150 may be configured as a passive infrared motion sensor, a microwave motion sensor, an ultrasonic motion sensor, a tomographic motion sensor, or any other suitable type of motion sensor.

An embodiment of a method of assembling the luminaire 10 will now be described with reference to the figures. Initially, the bottom and top parts 24 and 26 of the housing 12 may be connected together to enclose the light source 14, the electronics control assembly 16, the sensing assembly 18, the mounting assembly 50, and other components within the luminaire 10. Also, as a preliminary step, the elongated light pipe member 112 may be connected within the housing 12 such that the elongated light pipe member 112 extends downwardly or forwardly of the light source 14. This may be accomplished by fastening or otherwise connecting the elongated light pipe member 112 to the mounting assembly 50 and/or the sensing assembly 18.

Next, the first end 132 of the collar member 114 may be inserted into the opening 122 formed in the lens 15. In some embodiments, this insertion may create a tight fit or seal between the first end 132 of the collar member 114 and the wall defining the opening 122. The first end 132 of the collar member 114 may be inserted into the opening 122 formed in the lens 15 until the flange 144 flushly engages the interior surface 22 of the lens 15, as shown in FIGS. 4 and 5.

Subsequently, the lens 15 may be arranged below or forward of the bottom part 24 of the housing 12 with the attached collar member 114 aligned with the light entry end 118 of the elongated light pipe member 112. Then the lens 15 may be moved in a generally upward or rearward linear direction toward the bottom part 24 of the housing 12, such that the light entry end 118 of the elongated light pipe member 112 is received within the opening 136 formed in the second end 134 of the collar member 144, and simultaneously or immediately thereafter, the lens 15 covers the opening 17 formed in the bottom part 24 of the housing 12. If the light entry end 118 of the elongated light pipe member 112 is not exactly aligned with the center of the opening 136, the funnel-shaped interior surface 138 of the collar member 114 will guide the light entry end 118 of the elongated light pipe member 112 into the opening 136. In this way, the funnel-shaped interior surface 138 of the collar member 114 assists with connecting the elongated light pipe member 112 and the collar member 114 in the event that the light entry end 118 is not be precisely aligned with the center of the opening 136 in the collar member 114 in the moments before covering the opening 17 with the lens 15. In some embodiments, the elongated light pipe member 112 may be constructed of a rigid material so that it does not substantially bend or deform when being inserted into the collar member 114. Suitably rigid materials for the elongated light pipe member 112 may include, but are not limited to, certain types of thermoplastic (e.g., high-density polyethylene (HDPE), polycarbonate), acrylic, glass, and/or metal.

Subsequently the lens 15 may be fastened or otherwise secured to the bottom part 24 of the housing 12. In embodiments where the lens 116 is included, this element may be connected to the first end 132 of the collar member 114 as a final step, or it may be connected to the collar member 114 earlier in the assembly process.

The embodiments of the luminaire disclosed herein advantageously include a light pipe assembly that isolates or shields a sensor, or multiple sensors, housed within the luminaire from artificial light internally reflected within the luminaire. The accuracy with which the sensor can detect changes in the environment outside of the luminaire, such as changes in ambient lighting levels, for example, is thereby improved. Furthermore, the light pipe assembly according to the present disclosure is designed to facilitate its assembly within the luminaire. Other benefits and advantages are also possible and will be apparent to a person of ordinary skill who reviews the present disclosure.

As used herein, the upward direction refers to any direction generally extending away from the bottom part of the luminaire toward the top part of the luminaire, and is not limited to a direction that is oriented perpendicularly relative to the surface of the Earth. Furthermore, as used herein, the downward direction refers to any direction generally extending away from the top part of the luminaire toward the bottom part of the luminaire, and is not limited to a direction that is oriented perpendicularly relative to the surface of the Earth.

Furthermore, it is noted that the construction and arrangement of the luminaire and its various components and assemblies as shown in the various exemplary embodiments is illustrative only. Although only a few embodiments of the subject matter at issue have been described in detail in the present disclosure, those skilled in the art who review the present disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed herein. For example, elements shown as integrally formed may be constructed of multiple parts or elements, and vice versa. Also, the position of elements may be reversed or otherwise varied, and the nature or number of discrete elements or positions may be altered or varied. Accordingly, all such modifications are intended to be included within the scope of the present disclosure as defined in the appended claims. Furthermore, the order or sequence of any process or method steps may be varied or re-sequenced according to alternative embodiments. Other substitutions, modifications, changes and omissions may be made in the design, operating conditions and arrangement of the various exemplary embodiments without departing from the scope of the present disclosure.

What is claimed is:

1. A luminaire comprising:
    a housing;
    a first lens covering an opening formed in the housing;
    a light source disposed in the housing and configured to emit artificial light in a forward direction toward the first lens; and
    a light pipe assembly spanning at least a portion of a distance between the first lens and the light source, the light pipe assembly being configured to transport ambient light rays present in an environment outside of the housing to a location within the housing isolated from the artificial light.

2. The luminaire of claim 1, the light pipe assembly including an elongated light pipe member having a light entry end and a second end, the light entry end being positioned to receive the ambient light rays.

3. The luminaire of claim 2, the light pipe assembly including a collar member arranged around the light entry end of the elongated light pipe member.

4. The luminaire of claim 3, a first end of the collar member being inserted into an opening formed in the first lens and a second end of the collar member engaging an interior surface of the first lens, wherein the first end of the collar member is configured to inhibit artificial light internally reflected within the first lens from entering the light entry end of the elongated light pipe member.

5. The luminaire of claim 4, the second end of the collar member including a funnel-shaped interior surface such that a cross-sectional area of an opening formed in the second end of the collar member gradually decreases when moving from the second end of the collar member toward the first end of the collar member.

6. The luminaire of claim 4, an interior surface of the second end of the collar member being configured to sealingly engage an exterior surface of the light entry end of the elongated light pipe member so as to inhibit the artificial light from leaking into the light entry end of the elongated light pipe member.

7. The luminaire of claim 4, the light pipe assembly including a second lens covering the light entry end of the elongated light pipe member.

8. The luminaire of claim 7, an exterior surface of the second lens being substantially level with an exterior surface of the first lens.

9. The luminaire of claim 3, the elongated light pipe member including an opaque exterior surface so as to inhibit the artificial light from being transmitted through a wall of the elongated light pipe member.

10. The luminaire of claim 1, comprising a sensor positioned to receive at least some of the ambient light rays transported through the elongated light pipe member.

11. The luminaire of claim 10, the sensor being positioned at least partially within the second end of the elongated light pipe member.

12. A light pipe assembly for a luminaire, the light pipe assembly comprising:
    an elongated light pipe member having a light entry end and a second end; and
    a collar member arranged around the light entry end of the elongated light pipe member, the light entry end of the elongated light pipe member extending into and terminating within the collar member, the collar member having an interior surface configured to sealingly engage an exterior surface of the light entry end of the elongated light pipe member.

13. The light pipe assembly of claim 12, the collar member including a first end and a second end, the second end of the collar member including a flange disposed radially outwardly of the first end of the collar member.

14. The light pipe assembly of claim 13, the interior surface of the second end of the collar member being funnel-shaped such that a cross-sectional area of an opening formed in the second end of the collar member gradually decreases when moving from the second end of the collar member toward the first end of the collar member.

15. The light pipe assembly of claim 12, comprising a lens covering an opening formed in the light entry end of the light pipe member.

16. The light pipe assembly of claim 12, comprising an O-ring positioned between the interior surface of the collar member and the exterior surface of the light pipe member.

17. A method of assembling a luminaire, the method comprising:
    providing
        a housing including an opening,
        a light source connected within the housing and configured to emit artificial light toward the opening, and
        an elongated light pipe member connected within the housing, the elongated light pipe member having a light entry end positioned adjacent to the opening and a second end positioned adjacent to the light source;
    inserting a collar member into an opening formed in a first lens;
    aligning an opening formed in the collar member with the light entry end of the elongated light pipe member; and
    covering the opening formed in the housing with the first lens such that the light entry end of the elongated light pipe member is received within the opening formed in the collar member.

18. The method of claim 17, wherein inserting the collar member into the opening formed in the first lens comprises inserting a first end of the collar member into the opening formed in the first lens until a second end of the collar member engages an interior surface of the first lens.

19. The method of claim 18, wherein covering the opening formed in the housing with the first lens such that the light entry end of the elongated light pipe member is received within the opening formed in the collar member comprises using a funnel-shaped interior surface of the collar member to guide the light entry end of the elongated light pipe member into the collar member.

20. The method of claim 17, comprising covering an opening formed in the light entry end of the elongated light pipe member with a second lens.

21. The luminaire of claim 2, the light entry end of the elongated light pipe member being aligned with an opening formed in the first lens.

22. The luminaire of claim 2, the elongated light pipe member including an opaque exterior surface to inhibit the artificial light from being transmitted through a wall of the elongated light pipe member.

23. The light pipe assembly of claim 12, the collar member having an annular ridge extending inwardly from the interior surface, wherein the annular ridge abuts a terminal end surface of the light entry end of the elongated light pipe member.

24. The light pipe assembly of claim 12, the elongated light pipe member including an opaque exterior surface to inhibit light from being transmitted through a wall of the elongated light pipe member.

* * * * *